US006738209B2

(12) United States Patent
Chen

(10) Patent No.: US 6,738,209 B2
(45) Date of Patent: May 18, 2004

(54) APPARATUS FOR PROCESSING UNUSABLE AREA OF DISCS

(76) Inventor: Jack Chen, 5F-1, No. 84, Wu Han Street, North Dist., Taichung (TW)

( * ) Notice: Subject to any disclaimer, the term of this patent is extended or adjusted under 35 U.S.C. 154(b) by 0 days.

(21) Appl. No.: 10/265,481

(22) Filed: Oct. 7, 2002

(65) Prior Publication Data

US 2003/0030933 A1 Feb. 13, 2003

Related U.S. Application Data

(63) Continuation-in-part of application No. 09/726,167, filed on Nov. 29, 2000, now abandoned.

(51) Int. Cl.[7] .................................................. G11B 5/09
(52) U.S. Cl. ....................................................... 360/48
(58) Field of Search ..................... 369/59, 25; 360/48, 360/55, 234.4, 244.1, 75

(56) References Cited

U.S. PATENT DOCUMENTS

| 5,568,459 | A | 10/1996 | Takamori et al. |
| 5,712,747 | A | 1/1998 | Voldman et al. |
| 5,808,821 | A | 9/1998 | Davy |
| 6,195,217 | B1 | 2/2001 | Park |

FOREIGN PATENT DOCUMENTS

GB         2184869         7/1987

*Primary Examiner*—Alan T. Faber
(74) *Attorney, Agent, or Firm*—Charles E. Baxley

(57) ABSTRACT

A disc, such as the floppy disc, the compact disc, or either of the compact discs of the hard discs may be divided or formatted into a number of usable tracks and sectors. The other areas between the usable tracks are unformatted and unusable. An actuating or driving program may be used to actuate the recording head to process and record the unformatted or unusable areas of the disc. The actuating program may be directly introduced into the memory of the hard disc or of the computer, or may be stored in an independent working station.

1 Claim, 5 Drawing Sheets

APPARATUS FOR PROCESSING UNUSABLE AREA OF DISCS

The present invention is a continuation-in-part of U.S. patent application Ser. No. 09/726,167, filed Nov. 29, 2000, abandoned.

BACKGROUND OF THE INVENTION

1. Field of the Invention

The present invention relates to an apparatus, and more particularly to an apparatus for using or processing or treating or reading or writing the unusable area of discs, such as floppy discs, compact discs, hard discs, etc.

2. Description of the Prior Art

Typical discs, such as floppy discs, compact discs, hard discs, etc., are required to be formatted before they may be used and read and written. The floppy discs and the compact discs each includes a single disc member. As best shown in FIG. 1, the typical hard discs each normally includes a number of compact discs 70 stacked or superposed with each other with a hub or the like, and received in a housing 80 (FIG. 3).

As shown in FIGS. 1–3, the computer or the hard disc includes one or more magnetic or recording head 73 supported with flexures 71 and coupled to an electromagnetic driver 72 with the flexures 71, for processing or treating or reading or writing the discs 70, such as the floppy discs, the compact discs, the compact discs of the hard disc. The hard disc or the computer for processing the compact disc or floppy disc may include a built-in program to process or to format or to treat or to read or to write the discs.

As shown in FIG. 4, the typical discs 70 will be treated by the built-in program of the computer or of the hard disc and formatted into a number of formatted tracks 74, and each of the tracks 74 may be formatted into a number of sectors 76. As shown in FIGS. 5 and 6, the formatted tracks 74 are formatted or formed or defined by bursts or flags 0, 1, 2, . . . etc.

For example, as shown in FIG. 5, the tracks 74 are formatted or formed or defined between bursts or flags 0 and 1; 2 and 3; 4 and 5, 6 and 7; etc., such that the areas 77 formed or defined between the formatted tracks 74 will be undefined and unformatted and thus unusable, and may not be processed or treated or read or written by the recording head 73.

Similarly, as shown in FIG. 6, the tracks 74 may also be formatted or formed or defined between bursts or flags 1 and 2; 3 and 4; 5 and 6; etc., such that the areas 77 formed or defined between the formatted tracks 74 will also be undefined and unformatted and thus unusable, and may not be processed or treated or read or written by the recording head 73.

For example, the document entitled: Measurement Solutions for Disk Drive Design, opened to the public in the web site www.tektronix.com, shows that the tracks may be formed or defined or formatted between bursts 1 and 2, etc., and the areas between the formatted tracks also may not be used or processed or treated or read or written by the recording head.

Similarly, UK Patent Application No. GB 2184869 A to Stewart et al., entitled: Tracking magnetic discs also shows that the tracks may be formed or defined or formatted either between bursts 1 and 2; 3 and 4; 5 and 6; or between bursts 0 and 1; 2 and 3; 4 and 5; etc., and the areas between the formatted tracks also may not be used or processed or treated or read or written by the recording head.

Accordingly, after formatted, the floppy discs, the compact discs, or the compact discs of the hard disc may each include a number of unusable areas that are formed or defined between the formatted tracks, and that may not be used or processed or treated or read or written by the built-in program of the computer or of the hard disc. About or more than one-half of each of the discs will be wasted and may not be used.

U.S. Pat. No. 5,568,459 to Takamori et al., U.S. Pat. No. 5,712,747 to Voldman et al., U.S. Pat. No. 5,808,821 to Davy, U.S. Pat. No. 6,195,217 to Park also show several similar arts having a number of unusable areas formed or defined between the formatted tracks, and also unable to be used or processed or treated or read or written by the built-in program of the computer or of the hard disc.

The present invention has arisen to mitigate and/or obviate the afore-described disadvantages of the conventional disc reading and writing processes and apparatuses.

SUMMARY OF THE INVENTION

The primary objective of the present invention is to provide an apparatus having a program for formatting or processing or treating or reading or writing the unusable areas of discs, such as floppy discs, compact discs, or compact discs of hard discs.

In accordance with one aspect of the invention, there is provided an apparatus comprising at least one disc including a plurality of usable tracks formatted and formed alternatively therein with bursts, and including a plurality of unusable areas formed and defined between the tracks, a recording head for processing and recording the usable tracks and the unusable areas of the disc, and means for actuating the recording head to process the usable tracks and the unusable areas of the disc. The usable tracks and the unusable areas formed or defined between the usable tracks may thus all be treatable or usable or processable with the recording head.

The actuating means includes a memory coupled to the recording head, and an actuating program provided in the memory to actuate the recording head to process the usable tracks and the unusable areas of the disc.

The actuating means includes a working station having the memory provided therein and coupled to the recording head. Another memory may further be provided and coupled between the working station and the recording head.

A processing unit may further be provided and coupled between the recording head and the first memory, and coupled to the second memory.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 7:
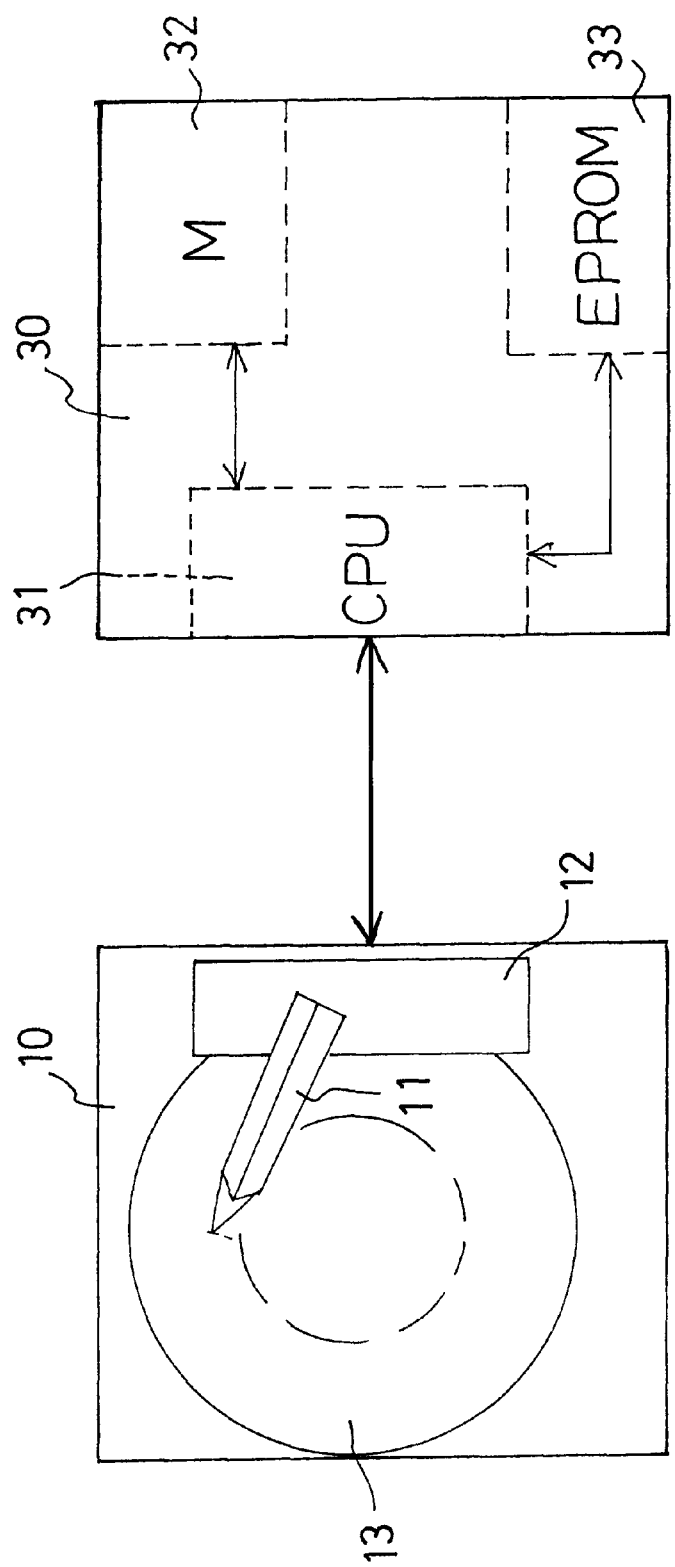
FIG. 7 is a block diagram illustrating a facility for conducting an apparatus in accordance with the present invention to use or to process or to treat or to read or to write the disc.

Referring to the drawings, and initially to FIG. 7, a typical hard disc 10 or a typical disc driver of a computer may include a recording head 11 for processing or treating or reading or writing the disc 13, and may include a memory 12 for storing the program to actuate the recording head 11 to process or to treat or to read or to write the disc 13. The recording head 11 may include the typical recording head supported by a flexure and coupled, with the flexure, to an electromagnetic driver.

Figure 1:
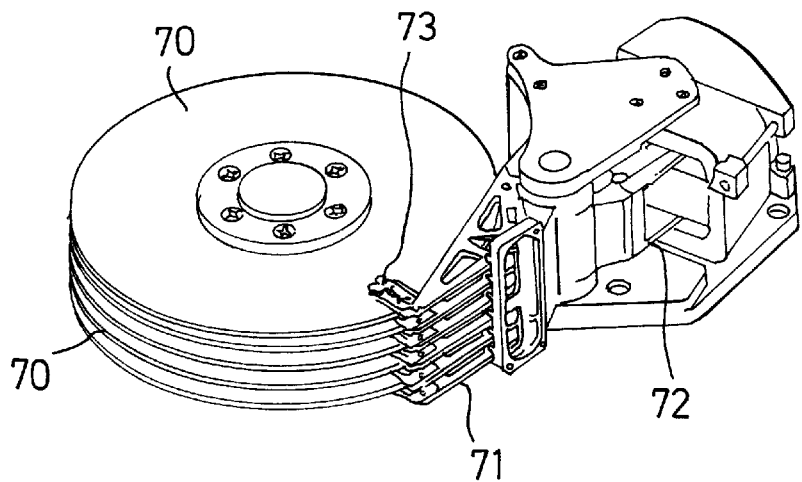
FIG. 1 is a perspective view showing an inner structure of a typical hard disc.
Figure 2:
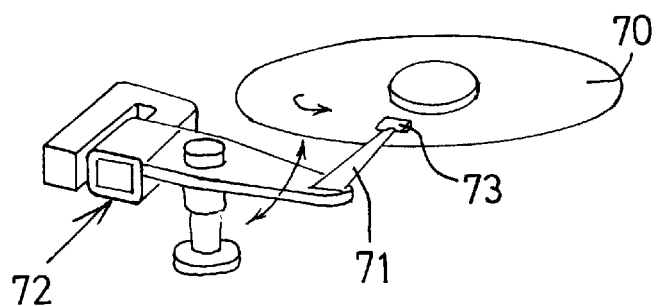
FIG. 2 is a perspective view illustrating the reading and writing process for the typical compact disc or hard disc.
Figure 4:
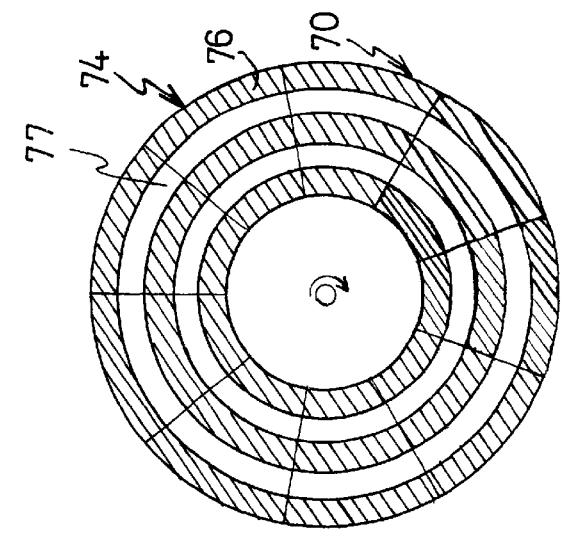
FIG. 4 is a plan schematic view illustrating the typical compact disc or hard disc after being formatted or illustrating the formatted areas and the unusable area of the typical compact disc or hard disc.
Figure 3:
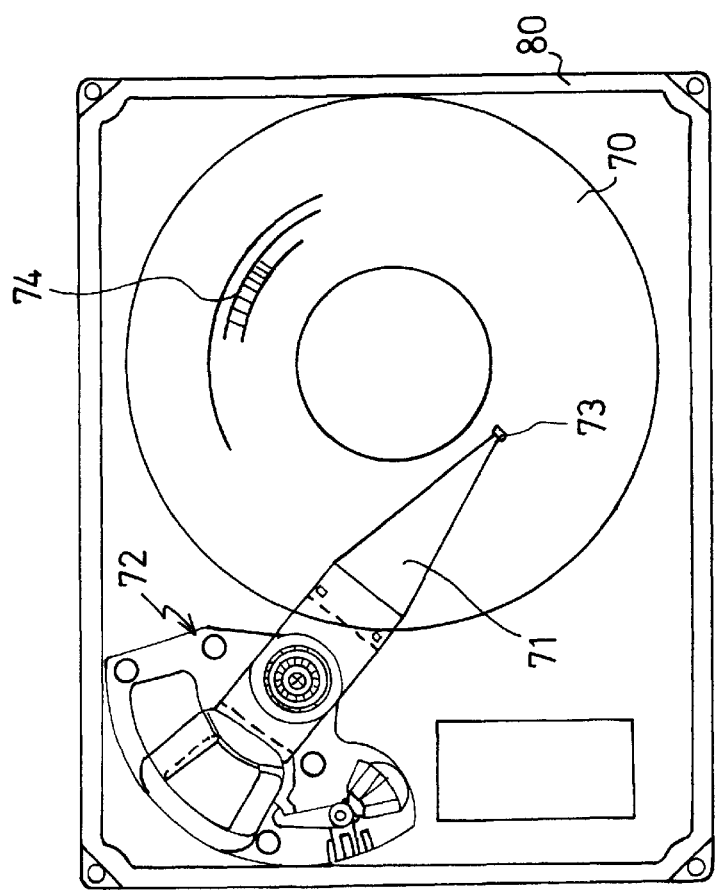
FIG. 3 is an upper schematic view illustrating the reading and writing process for the typical compact disc or hard disc.
Figure 5:
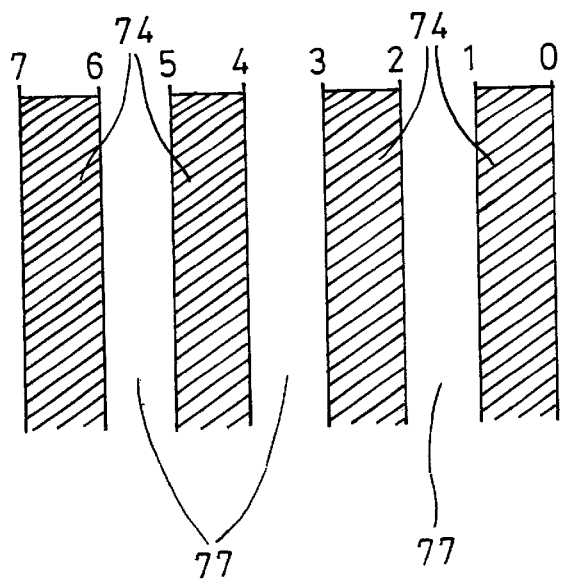
FIGS. 5, 6 are partial plan schematic views illustrating the definition or the formation of the formatted area and the unusable area of the typical compact disc or hard disc.
Figure 6:
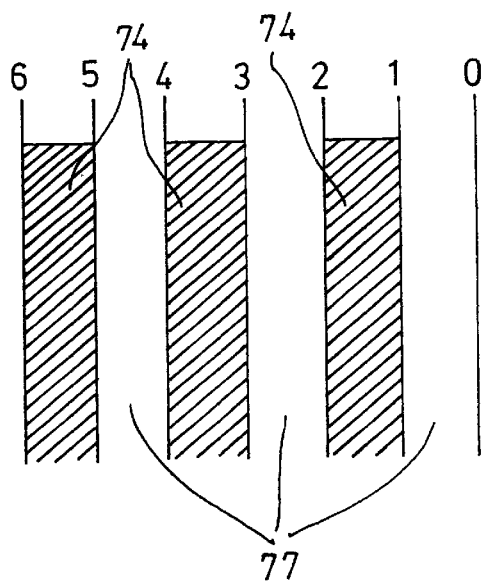

The typical discs of the hard discs or of the computer facilities may also be treated by the built-in program of the computer or of the hard disc and may also be formatted into a number of formatted tracks 74 (FIGS. 4–6), and each of the tracks 74 may also be formatted into a number of sectors 76. A number of areas 77 may also be formed or defined between the formatted tracks 74 that may also be alternatively formatted or formed or defined by bursts or flags 0, 1, 2, 3, 4 . . . etc.

An apparatus in accordance with the present invention comprises providing an independent card, or a circuit board or a working platform or a working station 30 having a processor unit (CPU) 31 or the like provided therein, and having one or more memories 32 for storing purposes and one or more erasable programmable read only memories (EPROM) 33 provided therein and coupled to the CPU 31.

The working station 30, such as the CPU 31 of the working station 30 is coupled directly to the recording head 11 or indirectly to the recording head 11 via the memory 12. The working station 30 of the present invention provides a driving or an actuating program in the EPROM 33 to actuate the recording head 11 to process or to treat or to read or to write or to format or to use the unusable areas 77 (FIGS. 4–6) of the disc 13.

It is to be noted that the driving or the actuating program of the present invention may also be directly introduced into the memory 12 of the hard disc 10 or of the disc driver 10 of the computer in order to actuate the recording head 11 to process or to treat or to read or to write or to format or to use the unusable areas 77 (FIGS. 4–6) of the disc 13. The working station 30 may also be the other independent floppy discs, the other independent compact discs, the other independent hard discs, etc.

Figure 8:
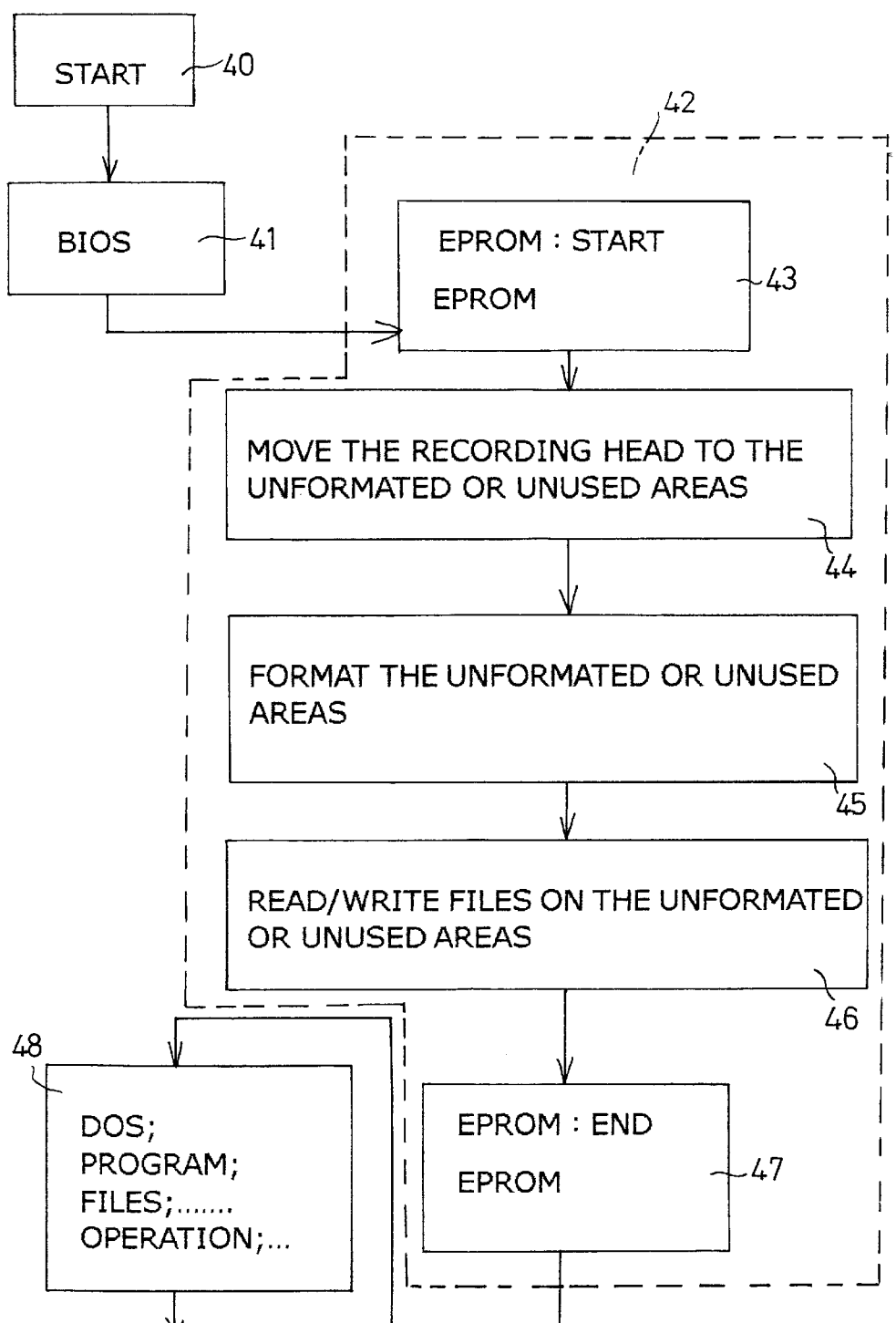
FIG. 8 is a flow chart illustrating the processes and the apparatus to use or to process or to treat or to read or to write the unusable areas of the disc.

Referring next to FIG. 8, illustrated is an example of a block diagram of the present invention to process or to treat or to read or to write or to format or to use the unusable areas 77 (FIGS. 4–6) of the disc 13. For example, when the computer or the hard disc 10 is actuated or started 40, the basic input/output system (BIOS) of the computer or of the hard disc 10 will first be actuated or initiated 41.

The apparatus will then be interrupted or actuated or controlled by the driving or the actuating program in the EPROM 33 and will be treated by the actuating program of the present invention as shown in the block 42. The actuating program in the EPROM 33 and will then be actuated or started as shown in the block 43, and will move (44) the recording head 11 to the unformatted or unusable areas of the disc 13, and to format (45) the unusable areas 77 (FIGS. 4–6) of the disc 13, and then to process or to treat or to read or to write or to record (46) the unformatted or unusable areas 77 of the disc 13.

After the unformatted or unusable areas of the disc 13 is used or processed, the EPROM will be ended at 47 and will then moved out of the block 42 and will then be entered into the typical processing system 48, such as the disc operating system (DOS), the programs, the files, and any other operation systems of the computer or of the hard disc.

It is to be noted that about or more than one-half of each of the typical discs will be wasted and may not be used. The areas in the typical discs may thus be treated by the present invention to have about double of the areas to be usable. The information or records of the disc 13 will be stored in the other formatted or used areas of the disc 13 that is less then one-half of the typical discs 13.

Accordingly, for example, all or some of the information stored in the formatted or used areas of the disc 13 may be copied into the unusable areas 77 of the disc 13 that are newly formatted. When the information stored in the previously formatted or used areas of the disc 13 is damaged inadvertently, for some reasons, the information copied or stored in the unusable and newly formatted areas 77 of the disc 13 may then be used and treated or processed, or may be copied into the previously formatted or used areas of the disc 13 to replace the damaged information. The unusable and newly formatted areas 77 of the disc 13 may also be used to store or to record the other information or the programs or the like.

The typical discs, such as the floppy discs, the compact discs, the compact discs of the hard disc may each be previously formatted into a number of areas, including a number of tracks and sectors. The actuating program of the working station of the present invention may be used to format and to process and to use all of the unformatted or unusable areas of the typical discs. The actuating program of the working station of the present invention may also be used, directly, to format and to process and to use all of the areas of the discs that have never been formatted or used.

Accordingly, the apparatus in accordance with the present invention may be used for formatting or processing or treating or reading or writing the unusable areas of the discs, such as the floppy discs, the compact discs, or the compact discs of the hard discs.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An apparatus comprising:

at least one disc including a plurality of usable tracks formatted and formed alternatively therein, and defined between bursts 0, 1; 2, 3; 4, 5, . . . etc., and including a plurality of unusable areas formed between said usable tracks, and defined between bursts 1, 2; 3, 4; 5, 6; . . . etc., a recording head for processing and recording said usable tracks and said unusable areas of said at least one disc, and a working station including a processing unit coupled to said recording head, a memory coupled to said processing unit, and an actuating program provided in said memory to actuate said recording head to process said usable tracks and said unusable areas of said at least one disc.

* * * * *